(12) United States Patent
Bonelli

(10) Patent No.: US 10,113,696 B1
(45) Date of Patent: Oct. 30, 2018

(54) INTEGRATED ON-BOARD LOW-PRESSURE ADSORBED NATURAL GAS STORAGE SYSTEM FOR AN ADSORBED NATURAL GAS VEHICLE

(71) Applicant: Adsorbed Natural Gas Products, Inc., Califon, NJ (US)

(72) Inventor: Robert Allen Bonelli, Califon, NJ (US)

(73) Assignee: Adsorbed Natural Gas Products, Inc., Califon, NJ (US)

( * ) Notice: Subject to any disclaimer, the term of this patent is extended or adjusted under 35 U.S.C. 154(b) by 0 days.

(21) Appl. No.: 15/899,123

(22) Filed: Feb. 19, 2018

Related U.S. Application Data

(60) Provisional application No. 62/527,657, filed on Jun. 30, 2017.

(51) Int. Cl.
*F17C 11/00* (2006.01)
*B60K 15/03* (2006.01)
*F02M 21/02* (2006.01)

(52) U.S. Cl.
CPC ...... *F17C 11/007* (2013.01); *B60K 15/03006* (2013.01); *F02M 21/0209* (2013.01); *F02M 21/0221* (2013.01); *F02M 21/0245* (2013.01); *B60K 2015/03309* (2013.01);
(Continued)

(58) Field of Classification Search
CPC .... F17C 1/00; F17C 11/007; B60K 15/03177; B60K 15/03006; B60K 15/07; B60K 15/013
See application file for complete search history.

(56) References Cited

U.S. PATENT DOCUMENTS

| | | |
|---|---|---|
| 2,663,626 A | 12/1953 | Spangler |
| 2,712,730 A | 7/1955 | Spangler |
| 3,722,481 A | 3/1973 | Braun |

(Continued)

FOREIGN PATENT DOCUMENTS

| | | |
|---|---|---|
| EP | 0812980 A2 | 12/1997 |
| GB | 2371029 A | 7/2002 |

(Continued)

OTHER PUBLICATIONS

Burchell et al., "Low Pressure Storage of Natural Gas for Vehicular Applications", SAE Technical Paper 2000-01-2205, 2000, 5 pages.
(Continued)

*Primary Examiner* — Hau V Phan
(74) *Attorney, Agent, or Firm* — Thompson Coburn LLP; Steven M. Ritchey

(57) ABSTRACT

An integrated adsorbed gaseous fuel storage and delivery system comprising an adsorbent in a tank wherein the adsorbent has (a) an initial Working Storage capacity of at least about 140 v/v % at a storage tank pressure of 900 psig, (b) a residual loss of storage capacity that is no more than 10%, and (c) it releases adsorbed gaseous fuel via a pressure differential between the tank pressure the pressure out of the tank without the application of a vacuum to the tank or heat to the adsorbent. The system also comprises a filter capable of passing through the filter at a rate of at least 50 cubic feet of gaseous fuel per minute at 50 psi, a pressure regulator for adjusting the pressure of the filtered gaseous fuel to an operating pressure for a fuel injection system, and an electronic control module capable of operating the fuel injection system.

30 Claims, 2 Drawing Sheets

(52) U.S. Cl.
CPC ............... *B60K 2015/03328* (2013.01); *F17C 2221/033* (2013.01); *F17C 2223/035* (2013.01)

(56) References Cited

U.S. PATENT DOCUMENTS

| | | | |
|---|---|---|---|
| 3,807,377 | A | 4/1974 | Hirschler, Jr. et al. |
| 4,227,497 | A | 10/1980 | Mathieson |
| 4,249,502 | A | 2/1981 | Hover |
| 4,483,305 | A | 11/1984 | Gilmor |
| 4,495,900 | A | 1/1985 | Stockmeyer |
| 4,522,159 | A | 6/1985 | Engel et al. |
| 4,531,558 | A | 7/1985 | Engel et al. |
| 4,742,801 | A | 5/1988 | Kelgard |
| 4,749,384 | A | 6/1988 | Nowobilski et al. |
| 4,887,556 | A | 12/1989 | Gladstone |
| 5,033,444 | A | 7/1991 | Kaufman et al. |
| 5,127,230 | A | 7/1992 | Neeser et al. |
| 5,315,973 | A | 5/1994 | Hill et al. |
| 5,323,752 | A | 6/1994 | von Herrmann et al. |
| 5,351,656 | A | 10/1994 | Teramoto et al. |
| 5,351,726 | A | 10/1994 | Diggins |
| 5,375,580 | A | 12/1994 | Stolz et al. |
| 5,377,645 | A | 1/1995 | Moore |
| 5,479,906 | A | 1/1996 | Collie |
| 5,499,615 | A | 3/1996 | Lawrence et al. |
| 5,501,200 | A | 3/1996 | Bogartz |
| 5,584,467 | A | 12/1996 | Harnett et al. |
| 5,615,655 | A | 4/1997 | Shimizu |
| 5,713,340 | A | 2/1998 | Vandenberghe et al. |
| 5,832,906 | A | 11/1998 | Douville et al. |
| 5,862,796 | A | 1/1999 | Seki et al. |
| 5,912,424 | A | 6/1999 | Judkins et al. |
| 6,176,225 | B1 | 1/2001 | Sams et al. |
| 6,929,679 | B2 | 8/2005 | Muller et al. |
| 7,308,889 | B2 | 12/2007 | Post et al. |
| 7,309,380 | B2 | 12/2007 | Muller et al. |
| 7,652,132 | B2 | 1/2010 | Yaghi et al. |
| 7,662,746 | B2 | 2/2010 | Yaghi et al. |
| 7,690,365 | B2 | 4/2010 | Lee et al. |
| 7,955,415 | B2 | 6/2011 | Farone |
| 8,147,599 | B2 | 4/2012 | McAlister |
| 8,919,325 | B2 | 12/2014 | Pursifull |
| 9,181,886 | B2 | 11/2015 | Grant et al. |
| 9,194,337 | B2 | 11/2015 | McAlister et al. |
| 9,827,849 | B2 | 11/2017 | Choi et al. |
| 2006/0042606 | A1 | 3/2006 | Van Dyke |
| 2009/0070008 | A1 | 3/2009 | Batenburg et al. |
| 2009/0229555 | A1 | 9/2009 | Ginzburg et al. |
| 2013/0160742 | A1 | 6/2013 | Brown et al. |
| 2013/0213363 | A1 | 8/2013 | Pruemm |
| 2013/0311067 | A1 | 11/2013 | Stockner et al. |
| 2014/0026868 | A1 | 1/2014 | Dolan et al. |
| 2014/0033944 | A1 | 2/2014 | Foege |
| 2014/0096539 | A1 | 4/2014 | Gustafson et al. |
| 2014/0123936 | A1 | 5/2014 | Kim et al. |
| 2014/0261304 | A1 | 9/2014 | McAlister et al. |
| 2015/0307076 | A1 | 10/2015 | Leone |
| 2017/0326972 | A1 | 11/2017 | Shen et al. |
| 2018/0001296 | A1 | 1/2018 | Holbrook et al. |
| 2018/0023516 | A1 | 1/2018 | Zhang et al. |
| 2018/0023518 | A1 | 1/2018 | Lee |

FOREIGN PATENT DOCUMENTS

| | | |
|---|---|---|
| WO | 2006/069681 A1 | 7/2006 |
| WO | 2013/130401 A1 | 9/2013 |

OTHER PUBLICATIONS

Shen et al, "Effects of Textural and Surface Characteristics of Metal-Organic Frameworks on the Methane Adsorption for Natural Gas Vehicular Application", Microporous and Mesoporous Materials, 2015, pp. 80-90, vol. 212.

Vasiliev et al., "Adsorbed Natural Gas Storage and Transportation Vessels", International Journal of Thermal Sciences, 2000, pp. 1047-1055, vol. 39.

INTEGRATED ON-BOARD LOW-PRESSURE ADSORBED NATURAL GAS STORAGE SYSTEM FOR AN ADSORBED NATURAL GAS VEHICLE

CROSS-REFERENCE TO RELATED APPLICATIONS

This application claims the benefit of U.S. Provisional Application No. 62/527,657, filed on Jun. 30, 2017, which is incorporated herein by reference in its entirety.

FIELD OF THE INVENTION

The present invention is generally directed to an on-board fuel storage and delivery system for an internal combustion engine configured to run on a gaseous fuel (e.g., natural gas) and, optionally, also a liquid hydrocarbon fuel such as gasoline or diesel. More specifically, it is directed to an on-board sorbent-based fuel storage and delivery system for gaseous fuels for storing and delivering adsorbed gaseous fuels to a fuel injection system of such an internal combustion engine designed to operate with fuel rail pressures in a low-pressure range of 1000 psi (6.9 MPa) down to 20 psi (0.14 MPa) when operating on gaseous fuel.

BACKGROUND OF INVENTION

Adsorbent-based gaseous fuel storage systems such as activated carbon or metal organic framework adsorbent storage of natural gas advantageously operate at lower pressures than non-sorbent systems. For example, due to the non-linear relationship between volumetric storage and pressure on the surface of adsorbent, a pressure vessel containing an adsorbent will hold a greater energy content of gaseous fuel at a pressure of 1000 psi (6.9 MPa) and less than an identically sized pressure vessel without the adsorbent at the same pressure. For example, adsorbent storage systems operate at relatively low pressures in a range of about 30 psi (0.21 MPa) to about 1000 psi (6.9 MPa) compared to 130 psi (9.0 MPa) to 3,600 psi (24.8 MPa) for conventional, non-adsorbent systems for internal combustion engines. While the lower pressures associated with adsorbent-based systems have the potential of being more readily utilized in applications such as motor vehicles due to the fact that the systems can be less robust, bulky, complicated, and costly than high pressure systems, there have been performance drawbacks that have hindered their acceptance. Such low pressure adsorbent systems also have the potential of being a commercially advantageous compared to electrification system for low carbon dioxide emitting vehicles, especially systems for large frame light duty vehicles such as full size sedans, sport utility vehicles, pick-up trucks, and light duty vans, but performance drawbacks have hindered their acceptance.

In view of the foregoing, a need still exists for an integration of equipment, materials, and methods for delivering gaseous fuel, in particular natural gas, from a sorbent-based storage tank to the fuel injection system of an internal combustion engine in a consistent and controlled manner in the low-pressure range of 30 psi (0.21 MPa) to about 1000 psi (6.9 MPa).

SUMMARY OF THE INVENTION

In one embodiment, the invention is directed to an integrated low-pressure adsorbed gaseous fuel storage and delivery system for an internal combustion engine, said integrated system comprising:

a) a fuel storage system that comprises:
  i) a storage tank having an interior;
  ii) an adsorbent within the interior of the storage tank to which gaseous fuel in the tank adsorbs, wherein the gaseous fuel, when in the tank, is at a tank pressure in a tank pressure range of about 1000 psi (6.9 MPa) to about 30 psi (0.21 MPa), wherein the adsorbent has the following characteristics:
    (a) an initial Working Storage capacity of at least about 140 v/v % at a storage tank pressure of 900 psig (6.2 MPa);
    (b) a residual loss of storage capacity that is no more than 10%; and
    (c) it releases adsorbed gaseous fuel and any detectable odorant included in or with the gaseous fuel via a pressure differential between the tank pressure and a pressure out of the storage tank without the application of a vacuum to the tank or heat to the adsorbent;
b) a filter in fluid connection with the fuel storage system through which desorbed gaseous fuel from the storage tank is capable of being passed, wherein the filter comprises opening sizes that prevent particulate from leaving the storage, and wherein the desorbed gaseous fuel from the storage tank is capable of passing through the filter at a rate of at least 50 cubic feet of gaseous fuel per minute at 50 psi (0.34 MPa);
c) a pressure regulator through which the flow of filtered gaseous fuel is capable of being matched to a demand for the gaseous fuel by the internal combustion engine and of adjusting the pressure of the filtered gaseous fuel to an operating pressure that is in a range of about 30 psi (0.21 MPa) to 150 psi (1.03 MPa);
d) a fuel injection system of an internal combustion engine, wherein the fuel injection system comprises one or more fuel injectors for delivering the regulated gaseous fuel from the storage tank to one or more combustion chambers of the internal combustion engine at or about the stoichiometric air-fuel ratio for the gaseous fuel; and
e) an electronic control module capable of operating the fuel injection system of the internal combustion engine so the one or more fuel injectors deliver the regulated gaseous fuel to the one or more combustion chambers of the internal combustion engine at or about the stoichiometric air-fuel ratio for the gaseous fuel.

In one embodiment, the invention is directed to the integrated system of the immediately preceding paragraph, wherein the adsorbent is selected from the group consisting of activated carbon, metal-organic frameworks, and combinations thereof.

In one embodiment, the invention is directed to the integrated system of the preceding paragraphs, wherein the adsorbent is activated carbon in the form of a monolith.

In one embodiment, the invention is directed to the integrated system of the immediately preceding paragraph, wherein the activated carbon monolith also comprises a binder.

In one embodiment, the invention is directed to the integrated system of the immediately preceding paragraph, wherein the monolith comprises at least about 90% volume of the activated carbon adsorbent and no more than about 10% volume of binder.

In one embodiment, the invention is directed to the integrated system of any one of the three preceding paragraphs, wherein the adsorbed carbon monolith has a theoretical volume of at least about 90% of the internal volume of the storage tank.

In one embodiment, the invention is directed to the integrated system of any one of the preceding paragraphs, wherein the gaseous fuel comprises one or more of the following methane, ethane, propane, N-butane, I-pentane, N-pentane, N-hexane, nitrogen, and combinations thereof.

In one embodiment, the invention is directed to the integrated system of any one of the preceding paragraphs, wherein the gaseous fuel is natural gas.

In one embodiment, the invention is directed to the integrated system of any one of the preceding paragraphs, wherein the opening sizes of the filter are about 100 mesh (150 micrometers).

In one embodiment, the invention is directed to the integrated system of any one of the preceding paragraphs, wherein the filter is a stacked filter.

In one embodiment, the invention is directed to the integrated system of any one of the preceding paragraphs, wherein the filter is within a portal boss of the storage tank.

In one embodiment, the invention is directed a vehicle comprising an internal combustion engine and the integrated system of any one of the preceding paragraphs.

In one embodiment, the invention is directed to a process of delivering a gaseous fuel to an internal combustion engine using the integrated low-pressure adsorbed gaseous fuel storage and delivery system of any one of the preceding paragraphs, the method comprising:
  a) desorbing the gaseous fuel adsorbed to the adsorbent;
  b) filtering the desorbed gaseous fuel by passing it through the filter;
  c) regulating the flow of the filtered gaseous fuel by passing it through the pressure regulator; and
  d) delivering the regulated gaseous fuel into the one or more combustion chambers of the internal combustion engine at or about the stoichiometric air-fuel ratio for the gaseous fuel with the fuel injection system by controlling the one or more fuel injectors with the electronic control module;
thereby delivering the gaseous fuel to the internal combustion engine for its operation at any selected throttle position regardless of the tank pressure within the tank pressure range.

DETAILED DESCRIPTION OF INVENTION

Figure 1:
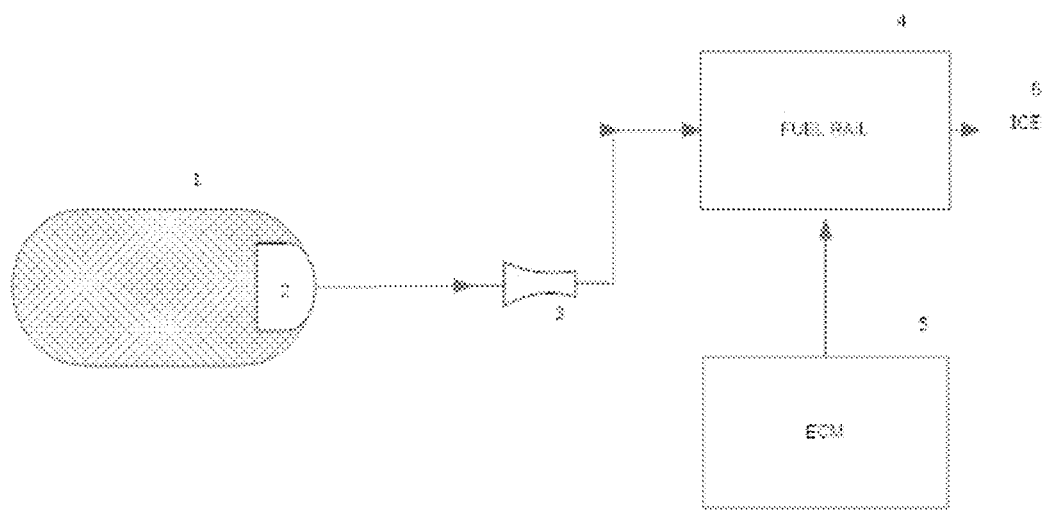
FIG. 1 is a schematic diagram of an embodiment of the integrated storage/delivery/operational system of the present invention for an internal combustion engine operating using natural gas in the low pressure range on 30 psi (0.21 MPa) to about 1000 psi (6.9 MPa).

A fully integrated low-pressure adsorbed natural gas (ANG) storage, delivery, and operational system unique in its composition of low-pressure designed, tuned, or programmed components. Referring to FIG. 1, in one embodiment the system comprises a storage tank 1 containing adsorbent (indicated with cross-hatching) and a low-pressure, high-flow particle filter 2 that resides within a portal boss (not depicted) affixed to the storage tank 1. The system also comprises a low-pressure regulator 3 in-line with an the engine fuel rail 4 that is equipped with low-pressure fuel injectors (not depicted). The system further comprises an electronic control module (ECM) 5 and the internal combustion engine (ICE) 6, wherein ECM controls one or more aspects of the low-pressure operation of the fuel rail injectors and/or the internal combustion engine.

Advantageously, the system is capable of storing and delivering gaseous fuel, including natural gas, at pressures from about 1000 psi (6.9 MPa) down to about 30 psi (0.21 MPa) to the fuel injection system of an internal combustion engine. Additionally, the system provides the operational control of the fuel injection system and internal combustion engine so that the internal combustion engine may efficiently and usefully operate on the gaseous fuel throughout the entire working fuel pressure range of the tank (i.e., from about 1000 psi (6.9 MPa) down to about 30 psi (0.21 MPa)).

In one embodiment, the system is installed on or part of a so-called "bi-fuel" vehicle comprising an internal combustion engine configured to operate on either gasoline or natural gas. In another embodiment, the system will operate in a so-called "dual-fuel" vehicle comprising an internal combustion engine configured to operate on a combination of diesel and natural gas. In yet another embodiment, the system will operate in a so-called 'mono-fuel" vehicle comprising an internal combustion engine configured to operate on natural gas alone. Regardless of the type of vehicle, the fully integrated low-pressure adsorbed natural gas system comprises a storage tank filled with an adsorbent; low-pressure, high-flow particle filtration; a low-pressure regulator; a fuel rail that comprises low-pressure fuel injectors; and an electronic control module programmed to operate the fuel injectors in the low-pressure range of about 30 psi (0.21 MPa) to about 1000 psi (6.9 MPa).

Fuel

Any gaseous fuel (not shown) or combination of gaseous fuels may be used. In one embodiment, the gaseous fuel is selected from the group consisting of methane, ethane, propane, N-butane, I-pentane, N-pentane, N-hexane, nitrogen, and combinations thereof. In another embodiment, the gaseous fuel comprises methane. In yet another embodiment, the gaseous fuel is natural gas.

Adsorbent

The adsorbent utilized in the system of the present invention satisfy several performance criteria described in detail below. The particular adsorbent utilized may, for example, comprise activated carbon, metal organic frameworks, or even a combination thereof so long the adsorbent satisfies the performance criteria.

In one embodiment, the sorbent comprises activated carbon. In another embodiment, the sorbent is activated carbon. In one embodiment, the sorbent is one or more types of activated carbon. In another embodiment, the sorbent comprises metal-organic frameworks. Examples of appropriate activated carbons include those derived from plant origins, such as corn cob, hard woods, soft woods or other similar cellulose structure, or from other carbon rich origins, such as polymers or polymer based materials, and then activated through an alkali, acid, steam, pressure, heat or any combination thereof.

In yet another embodiment, the sorbent is one or more types of metal-organic framework. Examples of appropriate metal-organic frameworks include those materials that are porous polymeric material, consisting of metal ions linked together by organic bridging ligands.

Minimum Initial Working Storage Capacity of Adsorbent

First, it is desirable for the adsorbent to have a so-called initial (i.e., when first contacted with gaseous fuel) "Working Storage Capacity" of at least about 140 v/v % at a storage tank pressure of 900 psig (6.2 MPa), wherein the "volume" of adsorbent (excluding the porosity of the adsorbent) in the storage tank is at least 90% of the internal volume of the storage tank. Results to date, have shown adsorbents having a Working Storage Capacity as high as about 140 v/v % at a storage tank pressure of 900 psig (6.2 MPa). In one embodiment, the adsorbent has a Working Storage Capacity of in a range of about 10 v/v % to about 140 v/v % at a storage tank pressure of 900 psig (6.2 MPa).

Adsorbent has a Limited Residual Loss of Storage Capacity

Second, it is desirable for the adsorbent have no more than about a 10% loss in the Working Storage Capacity over the life of the gaseous storage system which, for purposes of testing, is consider to be 10,000 cycles, wherein each cycle comprises adding gaseous fuel to the tank to at least 90% of the Working Storage Capacity and extracting said fuel to no more than 10% of the Working Storage Capacity. A loss in Working Storage Capacity is often referred to as "building a heel" or a "residual loss of storage capacity." So, this criteria may be referred to as the adsorbent building a heal of no more than a 10% or having a residual loss of storage capacity of no more than 10%.

Results to date indicate that the heel build-up or residual loss of storage is a one-time event that occurs with the first adsorption of gaseous fuel in the tank. After the initial fueling, no additional heel build-up or residual loss of storage capacity has been observed during subsequent fill cycles.

Adsorbent Readily Releases Adsorbed Gaseous Fuel and Odorant

Third, it is desirable for the adsorbent to readily release any gaseous fuel adsorbed thereto along with any detectable odorants included in or with the gaseous fuel simply via the pressure differential between tank pressure and the input of the fuel injection system, which presently can be as low as 30 psi (0.21 MPa).

In one embodiment, the adsorbent is selected so that it adsorbs and releases pipeline quality natural gas constituents without requiring molecular separation of the gas. Additionally, in said embodiment the adsorbent releases detectable odorant in or with the natural gas such that any release of gas from the tank, for example, during a filling operation is detectable.

Activated Carbon Monolith Adsorbent

Figure 2:
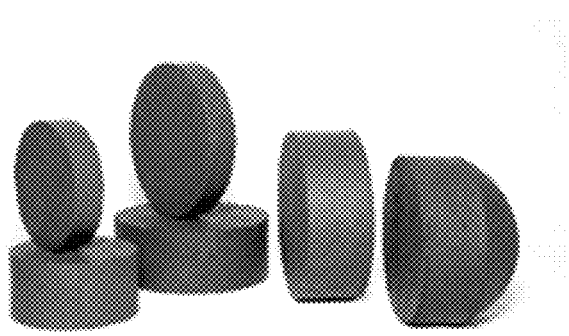
FIG. 2 is an image of exemplary activated carbon monoliths.

In certain embodiments, the adsorbent material is activated carbon in the form of a monolith that also comprises a binder such as shown in FIG. 2. In one such embodiment, the monolith comprises at least about 90% volume of the activated carbon adsorbent and no more than about 10% volume of binder. In another embodiment, the monolith comprises at least 95% volume of the activated carbon adsorbent and no more than about 5% volume of binder.

Advantageously, utilizing a monolithic form, rather than a particulate form, tends to maximize the amount of adsorbent material within a given internal volume. By utilizing an activate carbon monolith, the volume of adsorbent in the storage tank excluding porosity of the adsorbent, which shall be referred to herein as the "theoretical volume", is at least about 90% of the internal volume of the storage tank. In one embodiment, the theoretical volume of the adsorbent is at least 95% of the internal volume of the storage tank. In another embodiment, the theoretical volume of the adsorbent is at least 85% of the internal volume of the storage tank.

More information regarding one embodiment of activated carbon adsorbent monoliths is set forth U.S. Provisional Application Ser. No. 62/357,613, which is incorporated herein by reference in its entirety.

Another exemplary activated carbon adsorbent monolith is commercially available from Ingevity of North Charleston, S.C. under the NUCHAR® tradename.

Storage Tanks

Figure 4:
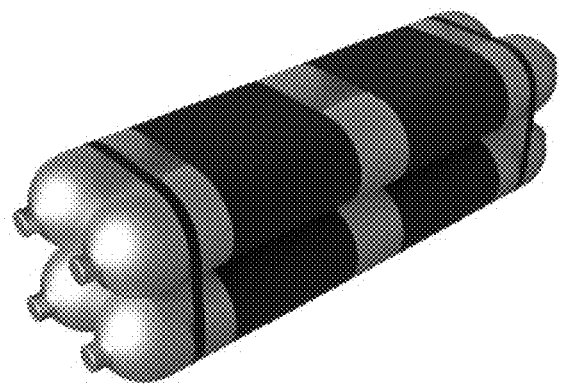
FIG. 4 is an image of an exemplary embodiment of a fuel storage system comprising a modular array of four cylindrical storage tanks.

Referring to FIG. 1 the fuel storage system comprises one or more storage tank(s) 1 appropriate for containing adsorbent (identified with crosshatching) and gaseous fuel (not identified). In one embodiment, the storage tank is a Type 1, 2, 3 or 4 cylinder that is seamlessly closed (i.e., without welds) to contain the adsorbent, even if the adsorbent is in monolithic form. In another embodiment, the fuel storage system comprises two (2) or more such cylinders, wherein the multiple cylinders may be configured in modular array as shown in FIG. 4.

Figure 3:
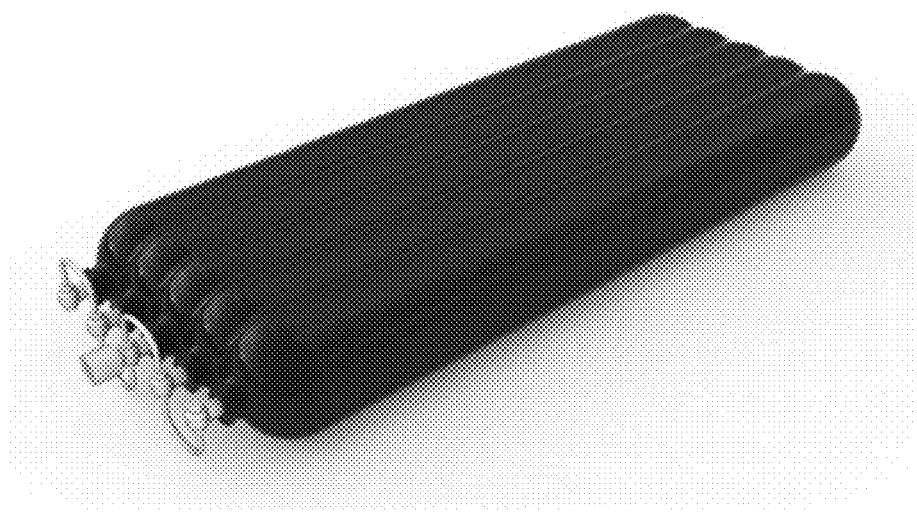
FIG. 3 is an image of an exemplary Type-IV conformable tank with an external manifold.

In yet another embodiment, the storage tank is a metal or composite multi-chambered configuration in which the chambers are in fluid communication via an external manifold (as shown in FIG. 3) or internal manifold system (not depicted). Such a multi-chambered has a ratio of overall internal volume to overall external displacement (i.e., the "conformity ratio") of >0.7 (or a "conformity" of >70%).

In one embodiment monoliths occupy between 90% and 100% of each tank or chamber of a multi-chambered tank.

To manufacture cylindrical tank containing a monolith adsorbent in a manner such that the tank is seamless, the tank may be made using the process of spin-forming thereby closing the cylindrical storage tank around the contained monolithic adsorbent. Such tanks, which are compliant with the American National Standard Institute NGV2 (ANSI NGV2), and which are compliant with an interim standard for the manufacture of adsorbed natural gas (ANG) storage tanks developed by the CSA Group, are commercially available from Worthington Industries of Pomona, Calif.

More information regarding the multi-chambered Type-IV conformable tank is set forth in U.S. Ser. No. 15/035,060 (U.S. Pub. No. US2016/0290464), entitled High Conformal Pressure Vessel, which is incorporated herein by reference in its entirety. Other relevant information regarding other appropriate tanks is found in the following:

U.S. Ser. No. 15/517,025, entitled Composite Pressure Vessel Assembly and Method of Manufacturing, filed on Apr. 5, 2017; and U.S. Pat. No. 9,476,546, entitled, Curved and Conformal High-Pressure Vessel; each of which is incorporated herein by reference its entirety.

Low-Pressure, High-Flow Stacked Particulate Filter

The low-pressure, high flow stacked particulate filter has/have opening sizes that are appropriate for preventing the escape of adsorbent particulate (e.g., that which may break away from the monolith) or particulate that enters the tank during a fueling operation of a size capable of substantially restricting flow in fuel lines or damaging other componentry in the fuel system of the internal combustion engine. Additionally, the particulate filter(s) is/are capable of flowing at least 50 cubic feet of natural gas per minute at 50 psi (0.34 MPa). In one embodiment, these characteristics are realized by selecting a filter having opening sizes that are about 100 mesh (150 micrometers). This filter technology is readily available in a stacked embodiment. While such filters may be placed in a variety of locations in the fuel delivery pathway, in one embodiment such filters are fixed within the portal boss(es) of the tank(s). It is believed that such and in-portal configuration eases installation of the system in a vehicle, reduces manufacturing and installation costs, and makes the system more compact and robust.

Low-Pressure Regulator

The low-pressure regulator is configured to allow natural gas from the storage tanks at a pressure as low as 30 psi (0.21 MPa) reach the fuel rail/fuel injection system of the internal combustion engine. The pressure regulator matches the flow of filtered gaseous fuel to a demand for the gaseous fuel by the internal combustion engine and adjusts the pressure of the filtered gaseous fuel to an operating pressure that is in a range of about 30 psi (0.21 MPa) to 150 psi (1.03 MPa). Such low-pressure regulators appropriate for gaseous fuel are widely available.

Fuel Rail/Fuel Injection System

The fuel rail/fuel injection system 4 for the internal combustion engine may be any system appropriate for delivering the selected gaseous fuel(s) to the engine for combustion appropriate system. Typically, the gaseous fuel is delivered to the internal combustion engine at or about the stoichiometric air-fuel ratio for the gaseous fuel.

In one embodiment, the fuel rail comprises one fuel injector per internal combustion cylinder and is capable of delivering fuel at or about the stoichiometric air-fuel ratio for the gaseous fuel at an incoming fuel pressure that is as low as 30 psi (0.21 MPa. An example of an appropriate commercially available fuel injection system is that provided by Westport Innovation, Inc. under the trade name WING™ Power System.

Electronic Control Module

The electronic control module (ECM) is programmed to operate the fuel injection system of the internal combustion engine with a gaseous fuel having a tank pressure in the tank pressure range of about 1000 psi (6.9 MPa) down to about 30 psi (0.21 MPa) when the internal combustion engine is operating on a gaseous fuel such as natural gas. Preferably, the calibration of such ECMs will be consistent with applicable regulations such as those promulgated by the Environmental Protection Agency and/or the California Air Resources Board (CARB). The programming of such an ECM is a routine matter for each manufacturer of the particular vehicle and/or engine supplier. For example, an ECM of a major automaker designed for use in high-pressure compressed natural gas (CNG) applications has been recalibrated to operate at pressures consistent with ANG in this case with fuel coming into the fuel injection system at pressures in a range of about 1000 psi (6.9 MPa) to about 75 psi (0.52 MPa) and in compliance with EPA regulations.

Process

The present invention is also directed to a process of delivering a gaseous fuel to an internal combustion engine using any one of the above-described embodiments of the integrated low-pressure adsorbed gaseous fuel storage and delivery system. The method comprising:

a) desorbing gaseous fuel that is adsorbed to the adsorbent;
b) filtering the desorbed gaseous fuel by passing it through the filter;
c) regulating the flow of the filtered gaseous fuel by passing it through the pressure regulator; and
d) delivering the regulated gaseous fuel into the one or more combustion chambers of the internal combustion engine at or about the stoichiometric air-fuel ratio for the gaseous fuel with the fuel injection system by controlling the one or more fuel injectors with the electronic control module;

thereby delivering the gaseous fuel to the internal combustion for its operation at any selected throttle position regardless of the tank pressure within the tank pressure range.

Having illustrated and described the principles of the present invention, it should be apparent to persons skilled in the art that the invention can be modified in arrangement and detail without departing from such principles.

Although the materials and methods of this invention have been described in terms of various embodiments and illustrative examples, it will be apparent to those of skill in the art that variations can be applied to the materials and methods described herein without departing from the concept, spirit and scope of the invention. All such similar substitutes and modifications apparent to those skilled in the art are deemed to be within the spirit, scope and concept of the invention as defined by the appended claims.

What is claimed is:

1. An integrated low-pressure adsorbed gaseous fuel storage and delivery system for an internal combustion engine, said integrated system comprising:

a) a fuel storage system that comprises:
   i) a storage tank having an interior;
   ii) an adsorbent within the interior of the storage tank to which gaseous fuel in the tank adsorbs, wherein the gaseous fuel, when in the storage tank, is at a tank pressure in a tank pressure range of about 1000 psi (6.9 MPa) to about 30 psi (0.21 MPa), wherein:
      (a) the adsorbent has an initial working storage capacity of at least about 140 v/v % at a storage tank pressure of 900 psig (6.2 MPa);
      (b) the adsorbent has a residual loss of storage capacity that is no more than 10%; and
      (c) the adsorbent releases adsorbed gaseous fuel and any detectable odorant included in or with the gaseous fuel via a pressure differential between the tank pressure and a pressure out of the storage tank without the application of a vacuum to the tank or heat to the adsorbent;

b) a filter in fluid connection with the fuel storage system through which desorbed gaseous fuel from the storage tank is capable of being passed, wherein the filter comprises opening sizes that prevent particulate from the adsorbent or introduced into the storage tank with the gaseous fuel from leaving the storage tank, and wherein the desorbed gaseous fuel from the storage tank is capable of passing through the filter at a rate of at least 50 cubic feet of gaseous fuel per minute at 50 psi (0.34 MPa);

c) a pressure regulator capable of matching the flow of filtered gaseous fuel to a demand for the gaseous fuel by the internal combustion engine and of adjusting the pressure of the filtered gaseous fuel to an operating pressure that is in a range of about 30 psi (0.21 MPa) to 150 psi (1.03 MPa);

d) a fuel injection system of an internal combustion engine, wherein the fuel injection system comprises one or more fuel injectors for delivering the regulated gaseous fuel from the storage tank to one or more combustion chambers of the internal combustion engine at or about the stoichiometric air-fuel ratio for the gaseous fuel; and e) an electronic control module capable of operating the fuel injection system of the internal combustion engine so the one or more fuel injectors deliver the regulated gaseous fuel to the one or more combustion chambers of the internal combustion engine at or about the stoichiometric air-fuel ratio for the gaseous fuel.

2. The integrated system of claim 1, wherein the adsorbent is selected from the group consisting of activated carbon, metal-organic frameworks, and combinations thereof.

3. The integrated system of claim 1, wherein the adsorbent is activated carbon in the form of a monolith.

4. The integrated system of claim 3, wherein the activated carbon monolith also comprises a binder.

5. The integrated system of claim 4, wherein the monolith comprises at least about 90% volume of the activated carbon adsorbent and no more than about 10% volume of binder.

6. The integrated system of claim 5, wherein the adsorbed carbon monolith has a theoretical volume of at least about 90% of the internal volume of the storage tank.

7. The integrated system of claim 1, wherein the gaseous fuel comprises one or more of the following methane, ethane, propane, N-butane, I-pentane, N-pentane, N-hexane, nitrogen, and combinations thereof.

8. The integrated system of claim 1, wherein the gaseous fuel is natural gas.

9. The integrated system of claim 1, wherein the opening sizes of the filter are about 100 mesh (150 micrometers).

10. The integrated system of claim 1, wherein the filter is a stacked filter and is located within a portal boss of the storage tank.

11. A vehicle comprising an internal combustion engine and an integrated low-pressure adsorbed gaseous fuel storage and delivery system for an internal combustion engine, said integrated system comprising:
  a) a fuel storage system that comprises:
    i) a storage tank having an interior;
    ii) an adsorbent within the interior of the storage tank to which gaseous fuel in the tank adsorbs, wherein the gaseous fuel, when in the storage tank, is at a tank pressure in a tank pressure range of about 1000 psi (6.9 MPa) to about 30 psi (0.21 MPa), wherein:
      (a) the adsorbent has an initial working storage capacity of at least about 140 v/v % at a storage tank pressure of 900 psig (6.2 MPa);
      (b) the adsorbent has a residual loss of storage capacity that is no more than 10%; and
      (c) the adsorbent releases adsorbed gaseous fuel and any detectable odorant included in or with the gaseous fuel via a pressure differential between the tank pressure and a pressure out of the storage tank without the application of a vacuum to the tank or heat to the adsorbent;
  b) a filter in fluid connection with the fuel storage system through which desorbed gaseous fuel from the storage tank is capable of being passed, wherein the filter comprises opening sizes that prevent particulate from the adsorbent or introduced into the storage tank with the gaseous fuel from leaving the storage tank, and wherein the desorbed gaseous fuel from the storage tank is capable of passing through the filter at a rate of at least 50 cubic feet of gaseous fuel per minute at 50 psi (0.34 MPa);
  c) a pressure regulator capable of matching the flow of filtered gaseous fuel to a demand for the gaseous fuel by the internal combustion engine and of adjusting the pressure of the filtered gaseous fuel to an operating pressure that is in a range of about 30 psi (0.21 MPa) to 150 psi (1.03 MPa);
  d) a fuel injection system of an internal combustion engine, wherein the fuel injection system comprises one or more fuel injectors for delivering the regulated gaseous fuel from the storage tank to one or more combustion chambers of the internal combustion engine at or about the stoichiometric air-fuel ratio for the gaseous fuel; and
  e) an electronic control module capable of operating the fuel injection system of the internal combustion engine so the one or more fuel injectors deliver the regulated gaseous fuel to the one or more combustion chambers of the internal combustion engine at or about the stoichiometric air-fuel ratio for the gaseous fuel.

12. The vehicle of claim 11, wherein the adsorbent is selected from the group consisting of activated carbon, metal-organic frameworks, and combinations thereof.

13. The vehicle of claim 11, wherein the adsorbent is activated carbon in the form of a monolith.

14. The vehicle of claim 13, wherein the activated carbon monolith also comprises a binder.

15. The vehicle of claim 14, wherein the monolith comprises at least about 90% volume of the activated carbon adsorbent and no more than about 10% volume of binder.

16. The vehicle of claim 15, wherein the adsorbed carbon monolith has a theoretical volume of at least about 90% of the internal volume of the storage tank.

17. The vehicle of claim 11, wherein the gaseous fuel comprises one or more of the following methane, ethane, propane, N-butane, I-pentane, N-pentane, N-hexane, nitrogen, and combinations thereof.

18. The vehicle of claim 11, wherein the gaseous fuel is natural gas.

19. The vehicle of claim 11, wherein the opening sizes of the filter are about 100 mesh (150 micrometers).

20. The vehicle of claim 11, wherein the filter is a stacked filter and is located within a portal boss of the storage tank.

21. A process of delivering a gaseous fuel to an internal combustion engine,
the process comprising:
  a) desorbing the gaseous fuel adsorbed to an adsorbent within a storage tank of a fuel storage system, wherein the gaseous fuel, when in the storage tank, is at a tank pressure in a tank pressure range of about 1000 psi (6.9 MPa) to about 30 psi (0.21 MPa), and wherein:
    i) the adsorbent has an initial working storage capacity of at least about 140 v/v % at a storage tank pressure of 900 psig (6.2 MPa);
    ii) the adsorbent has a residual loss of storage capacity that is no more than 10%; and
    iii) the adsorbent releases adsorbed gaseous fuel and any detectable odorant included in or with the gaseous fuel via a pressure differential between the tank pressure and a pressure out of the storage tank without the application of a vacuum to the tank or heat to the adsorbent;
  b) filtering the desorbed gaseous fuel by passing the desorbed gaseous fuel through a filter, wherein the filter is in fluid connection with the fuel storage system, and wherein the filter comprises opening sizes that prevent particulate from the adsorbent or introduced into the storage tank with the gaseous fuel from leaving the storage tank, and wherein the desorbed gaseous fuel from the storage tank is capable of passing through the filter at a rate of at least 50 cubic feet of gaseous fuel per minute at 50 psi (0.34 MPa);
  c) regulating the flow of the filtered gaseous fuel by passing the filtered gaseous fuel through a pressure regulator, wherein the pressure regulator is capable of matching the flow of filtered gaseous fuel to a demand for the gaseous fuel by the internal combustion engine and of adjusting the pressure of the filtered gaseous fuel to an operating pressure that is in a range of about 30 psi (0.21 MPa) to 150 psi (1.03 MPa); and d) delivering the regulated gaseous fuel into the one or more combustion chambers of the internal combustion engine at or about the stoichiometric air-fuel ratio for the gaseous fuel with a fuel injection system and an electronic control module, wherein:
   i) the fuel injection system comprises one or more fuel injectors for delivering the regulated gaseous fuel from the storage tank to one or more combustion chambers of the internal combustion engine at or about the stoichiometric air-fuel ratio for the gaseous fuel; and
   ii) the electronic control module is capable of operating the fuel injection system so the one or more fuel injectors deliver the regulated gaseous fuel to the one or more combustion chambers of the internal combustion engine at or about the stoichiometric air-fuel ratio for the gaseous fuel;

thereby delivering the gaseous fuel to the internal combustion engine for its operation at any selected throttle position regardless of the tank pressure within the tank pressure range.

22. The process of claim 21, wherein the adsorbent is selected from the group consisting of activated carbon, metal-organic frameworks, and combinations thereof.

23. The process of claim 21, wherein the adsorbent is activated carbon in the form of a monolith.

24. The process of claim 23, wherein the activated carbon monolith also comprises a binder.

25. The process of claim 24, wherein the monolith comprises at least about 90% volume of the activated carbon adsorbent and no more than about 10% volume of binder.

26. The process of claim 25, wherein the adsorbed carbon monolith has a theoretical volume of at least about 90% of the internal volume of the storage tank.

27. The process of claim 21, wherein the gaseous fuel comprises one or more of the following methane, ethane, propane, N-butane, I-pentane, N-pentane, N-hexane, nitrogen, and combinations thereof.

28. The process of claim 21, wherein the gaseous fuel is natural gas.

29. The process of claim 21, wherein the opening sizes of the filter are about 100 mesh (150 micrometers).

30. The process of claim 21, wherein the filter is a stacked filter and is located within a portal boss of the storage tank.

* * * * *